No. 889,654. PATENTED JUNE 2, 1908.
R. BLAIR.
POTATO PLANTER.
APPLICATION FILED SEPT. 16, 1907.

5 SHEETS—SHEET 1.

Witnesses:
J. S. Austin
F. E. Sheehy

Inventor:
Robert Blair
by
Joshua R. H. Potts
Atty.

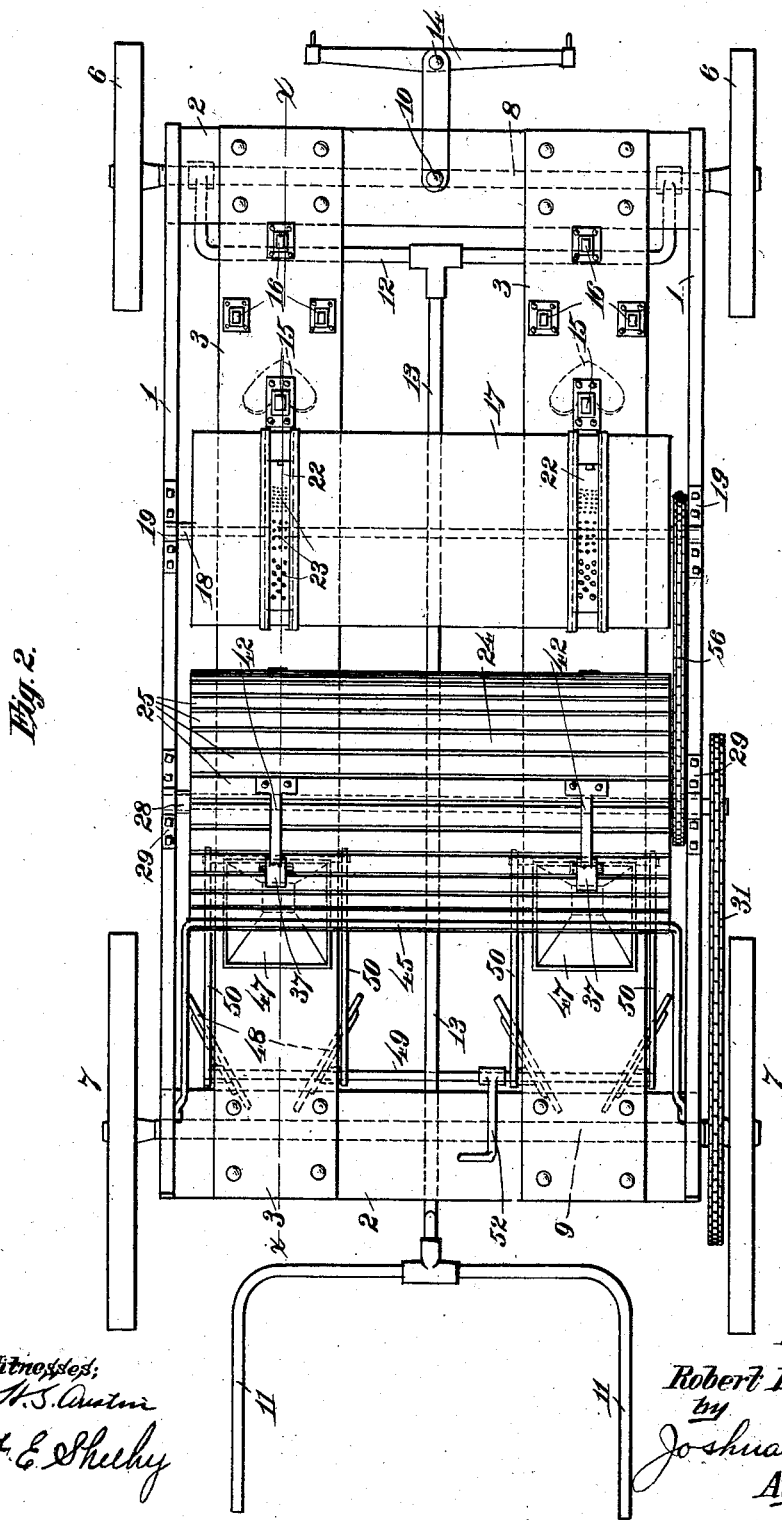

No. 889,654. PATENTED JUNE 2, 1908.
R. BLAIR.
POTATO PLANTER.
APPLICATION FILED SEPT. 16, 1907.
5 SHEETS—SHEET 3.
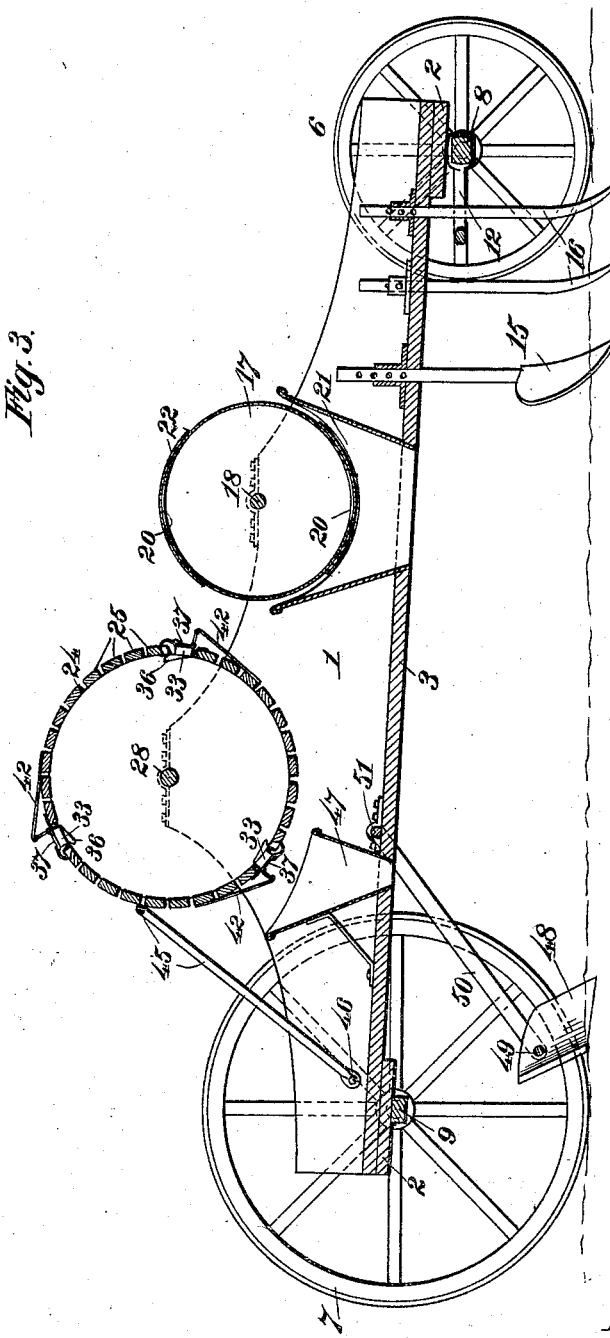

No. 889,654. PATENTED JUNE 2, 1908.
R. BLAIR.
POTATO PLANTER.
APPLICATION FILED SEPT. 16, 1907.
5 SHEETS—SHEET 4.
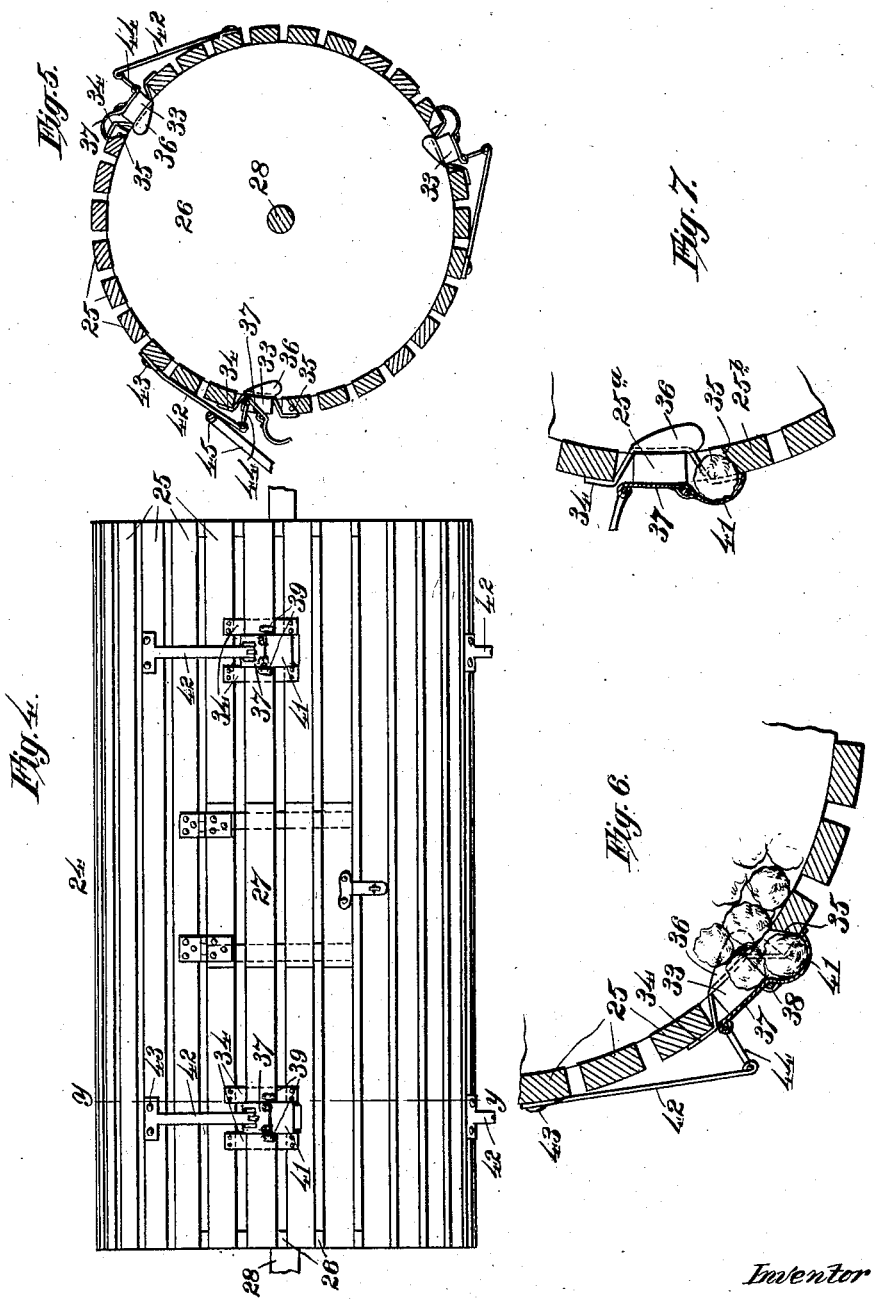

No. 889,654. PATENTED JUNE 2, 1908.
R. BLAIR.
POTATO PLANTER.
APPLICATION FILED SEPT. 16, 1907.

5 SHEETS—SHEET 5.

Witnesses:
W. J. Austin
H. E. Sheehy

Inventor
Robert Blair,
by
Joshua R. H. Potts
Atty.

UNITED STATES PATENT OFFICE.

ROBERT BLAIR, OF CHICAGO, ILLINOIS.

POTATO-PLANTER.

No. 889,654.     Specification of Letters Patent.     Patented June 2, 1908.

Application filed September 16, 1907. Serial No. 393,077.

*To all whom it may concern:*

Be it known that I, ROBERT BLAIR, a citizen of the United States, residing at Chicago, in the county of Cook and State of Illinois, have invented certain new and useful Improvements in Potato-Planters, of which the following is a specification.

My invention relates to planters and particularly to those especially adapted for planting potatoes.

The object of my invention is to provide, in a potato planter, means for dropping the seed at regular intervals and but one seed at a time.

A further object of my invention is to provide a potato planter which will automatically operate to plant one or more rows of potatoes simultaneously, and perform all of the operations incident thereto as perfectly and more rapidly than can be done by hand.

Other objects will appear hereinafter.

With these objects in view my invention consists in the potato planter and the various novel details of construction and combination of parts hereinafter described, and particularly pointed out in the claims.

Figure 1:
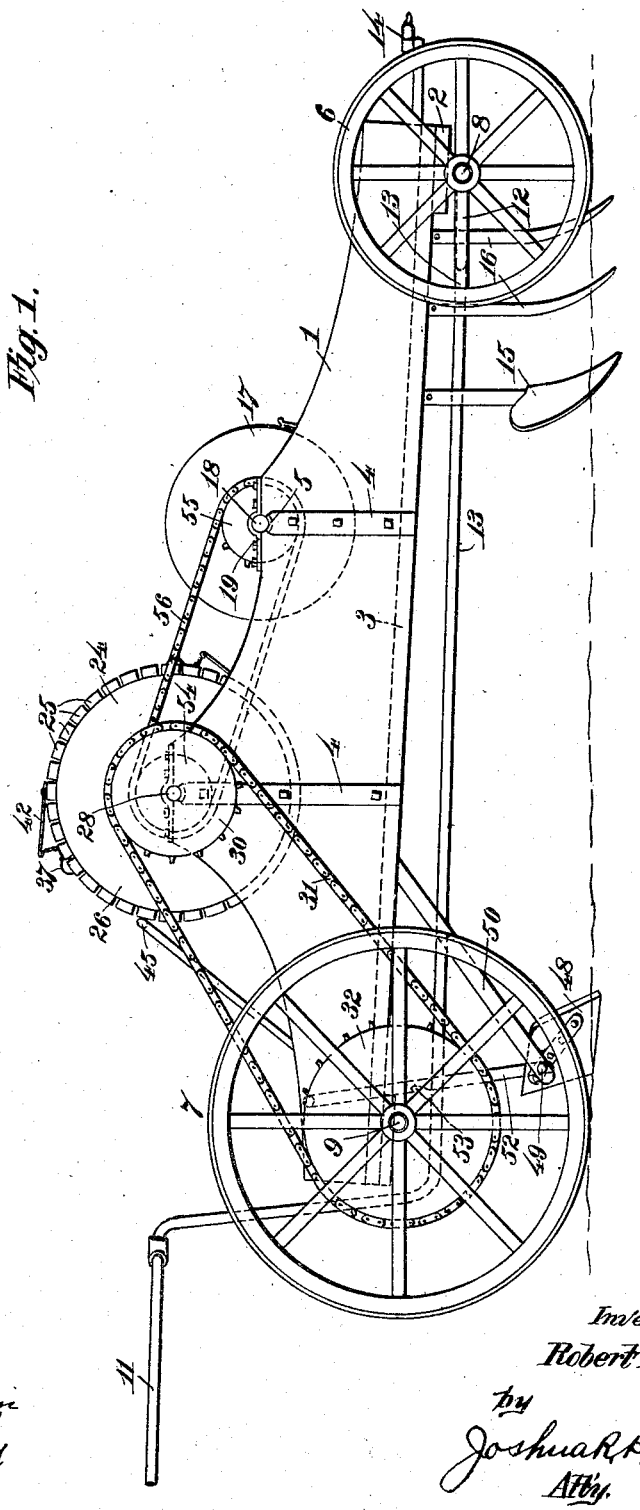
Figure 10:
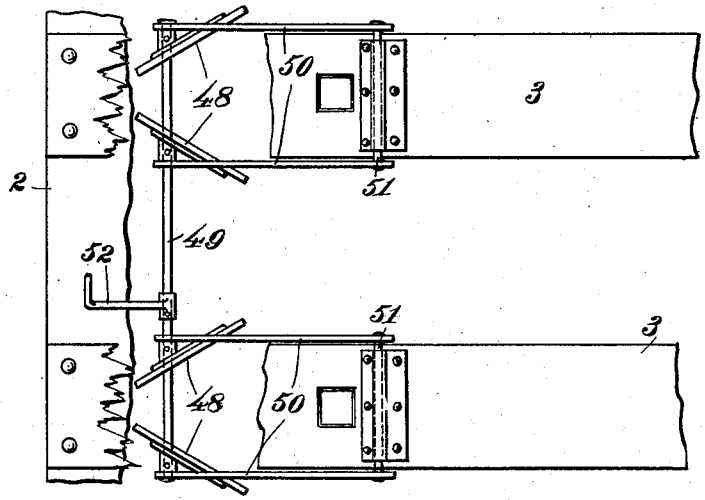
Figure 9:
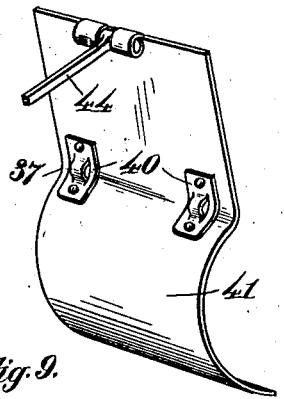
Figure 8:
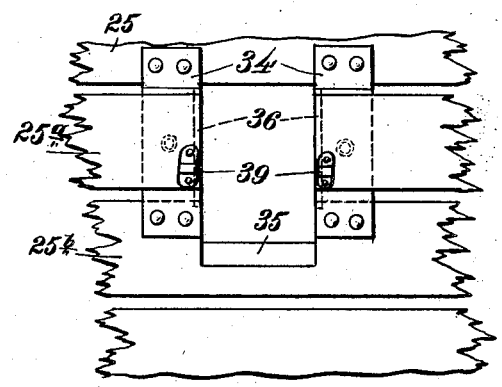

My invention will be more readily understood by reference to the accompanying drawings forming a part of this specification and in which, Figure 1 is a side elevation of a potato planter embodying my invention in its preferred form, Fig. 2 is a plan view thereof, Fig. 3 is a vertical longitudinal section taken on the line $x$—$x$ of Fig. 2, Fig. 4 is an elevation of the seed reservoir or barrel, Fig. 5 is a section taken on the line $y$—$y$ of Fig. 4, Fig. 6 is a detail, upon a much enlarged scale, of the seed dropper illustrating the same in a position to receive a seed, Fig. 7 is a similar view illustrating the dropper in the position just before dropping the seed, Fig. 8 is a detail of the seed discharge opening with the dropper removed, Fig. 9 is a perspective view of the dropper upon a very much enlarged scale, and Fig. 10 is a detail plan view of a portion of the rear of the planter illustrating the furrow closers.

The planter shown in the drawings, and illustrating the preferred embodiment of my invention, comprises generally, a suitable frame mounted upon wheels and provided with a draft gear, means for pulverizing the ground, a furrow opener, a fertilizing device, a suitable seed dropper and a furrow closer.

Referring to the drawings, it will be seen that the frame of the planter comprises the side members, 1—1, extending from end to end of the machine and connected at their ends by the transverse members, 2, and a pair of bottom members, 3—3 extending from one transverse member, 2, to the other and securely fastened thereto. In the drawings, I have illustrated a planter adapted to plant two rows at a time, but it is obvious that the device may be made narrower and arranged to plant but one row. In the latter instance, but one member, 3 will be provided. The side members, 1 of the frame are strengthened by the strips, 4 riveted or bolted thereto. The members, 4 are arranged beneath the ends of the shafts of the seed barrel and fertilizer barrel which will be described hereinafter, and their upper ends are bent inwardly and curved as at 5 to form bearings for said shafts. The frame is mounted upon the wheels 6—6 and 7—7 arranged upon the front and rear axles, 8 and 9 respectively. In order to properly guide the planter, the front axle is pivotally connected as at 10 to the front transverse member, 2, and the axle is suitably connected to the handles, 11 at the rear of the machine. To this end the ends of the axle, 8 are connected by a yoke or drag link, 12 and the link is connected to the handle by a bar or rod, 13.

14 indicates the draft member.

15 indicates the furrow opener, one of which is provided upon each of the members, 3, and each furrow opener is preferably adjustably secured to its respective member, 3, as shown, in order that the depth of the furrow may be regulated as desired. In order to better prepare the ground for planting, I provide in front of each furrow opener a plurality of pulverizers or harrow teeth, 16. These are also adjustably fixed to the member, 3, and sufficiently pulverize the ground before the furrow is opened. This is quite important, especially if the ground has been prepared any considerable length of time before the planting.

The fertilizing device comprises a cylindrical container, 17 rotatably mounted upon an axle, 18 extending transversely of the machine and journaled in bearings in the side members, 1, said bearings being formed of the ends, 5 of the members, 4, and the cap plates, 19. The cylinder is provided with the discharge openings, 20 which are arranged in the periphery of the cylinder and discharge into a hopper 21 arranged on the member, 3 directly behind the furrow opener. Each discharge opening is covered by a slidable plate, 22 having a plurality of groups of holes, 23, the holes of each group being of a different size from the holes of the other groups. By shifting the plate, 23 so that one of the groups of holes is arranged in front of the opening, 20, the device may be adjusted for use with fertilizers of different degrees of fineness, or the plates may be adjusted to vary the quantity of the fertilizer to be deposited, as required. The cylinder is rotated in a manner hereinafter described.

The seed dropping mechanism comprises a rotatable reservoir or seed barrel, 24 provided with one or more seed droppers; and means for operating the same. The seed barrel is cylindrical and is formed of a plurality of strips or slats, 25, and the end members, 26; and is provided with a door, 27 for filling the same. The barrel is mounted for rotation upon a shaft, 28, extending longitudinally therethrough, and having bearings, 29 in the frame members, 1. Upon one end of the shaft is a sprocket wheel, 30 connected by a chain 31, to a sprocket, 32, on one of the rear wheels, 7; hence, when the machine is in operation, the seed barrel is continuously rotated. The fertilizer container, 17 is driven from the shaft, 28. To this end, the shafts, 28 and 18 are provided with sprocket wheels, 54 and 55 respectively connected by a chain, 56; and the rotation of the cylinders are so timed that the fertilizer will be deposited in the furrow at approximately the same place that the seed will be dropped.

The barrel 24 is provided with one or more seed discharge openings, 33 each normally closed by a seed dropper. In the drawings, I have shown three droppers for each furrow. Each discharge opening is formed by cutting away a section of one of the slats 25ª and a portion of the adjacent slat, 25ᵇ, and the loose or free ends of the slats, 25ª are supported by metal strips, 34 secured to said ends and to the adjacent slats, (see Figs. 6, 7 and 8). The strips, 34 are preferably secured to the outer face of the adjacent slats and are bent under the ends of the slats, 25ª. It should be noted that the opening 33 is formed with an outwardly inclined face or edge, 35, which forms the bottom of the discharge opening when in discharging position, and also forms with the seed dropper, a pocket to receive one seed at a time.

36 indicates flanges formed upon the sides of the strips, 34. These are arranged flush with the edges of the holes, 33 and form guides for the seed, to direct them into the pocket and also prevent the seed from "arching" or otherwise choking the entrance to the pockets.

Each opening, 33 is covered by a seed dropper which comprises a plate, 37 pivoted to swing upon its transverse axis, defined by a rod, 38, arranged in brackets, 39 upon the ends of the slats, 25ª. The dropper is secured to the rod, 38 by slotted plates, 40, riveted or soldered thereto. The rod, 38 divides the plate, 37 into two parts, one of which is preferably curved as at 41 to form a portion of the pocket. (See Figs. 6 and 7.) The pocket defined by the portion, 41 of the plates, 37 and the lower walls of the opening, 33 is of just sufficient size, to receive and hold one seed at a time. In operation the barrel is only partially filled with seed so that when the pocket reaches the position shown in Fig. 7, all the seed but the one in the pocket roll back into the bottom of the barrel and away from the opening which is about to discharge. The inclined face, 35 retains the one seed in the pocket until the pocket is opened to drop the seed.

42 indicates a spring secured to the barrel as at 43, and is connected by a rod, 44, to the end of the plate, 37 opposite from the pocket portion, 41. The spring 42 normally holds the pocket closed as shown in Figs. 6 and 7.

To open the pockets at the proper time, I provide a rod, 45 pivotally connected to the sides, 1, as at 46, normally resting against the seed barrel. As the barrel rotates the rod, 45 depresses the springs, 42 of the several droppers successively, opening the pocket as shown in Fig. 5. When the pocket is opened the seed drops into a hopper or chute, 47 which directs it into the open furrow. When turning the machine at the end of the row or at other times when it is not desirable to feed the seed, the rod, 45 is thrown back out of the path of the spring, 42.

48 indicates the furrow closers which are mounted in pairs on the rod, 49. The rod, 49 is connected to the machine by a plurality of bars, 50, pivoted to rods, 51, secured to the members, 3 in front of the chute, 47.

52 indicates a bar or lever by which the furrow closers, 48 may be raised and 53 a notch therein to engage the edge of the member 2 to retain the closers in raised position.

The operation of the device is as follows: The barrel, 24 is about half filled with seed of substantially uniform size, and the feed door closed and fastened. The device is then drawn over the field which is to be planted and in the direction it is desired that the rows shall be. As the machine advances the harrow teeth pulverize the ground in advance of the furrow opener, which opens a furrow of the desired depth governed by the vertical adjustment of the furrow opener with relation to the frame. The reservoirs, 17, and 24 are continuously rotated from one of the rear wheels, 7, and as the reservoir, 17 revolves, it deposits a certain determinable quantity of fertilizer in the freshly opened furrow. By the time the hopper, 27 reaches a position above the fertilizer which has been deposited in the furrow, the rod, 45 actuates the seed droppers to release a seed which drops from the pocket through the hopper, 47 and into the furrow. The furrow closers, 48 then draw the earth over the seed.

It is evident that the seed barrel may be provided with any number of seed droppers and that the rotation of said barrel may be so timed as to plant the seed at any desired distance apart.

Having described my invention what I claim as new and desire to secure by Letters Patent is:

1. In a device of the class described, a suitable frame and a furrow opener, in combination with a seed barrel mounted for rotation in said frame, means for rotating said barrel, a discharge opening in said barrel, a plate pivotally mounted on said barrel and normally closing said opening and forming with the walls of said opening a seed pocket, a flexible spring arm connected at one end to said barrel and by a rod at the other end to said plate, and means for depressing said arm at regular intervals to open said pocket, and a furrow closer.

2. In a device of the class described a suitable frame, provided with a furrow opener and a furrow closer, in combination with a seed barrel mounted for rotation in said frame, means for rotating said barrel, a discharge opening in said barrel, a plate pivotally mounted on said barrel and normally closing said opening, said plate forming with the walls of said opening a seed pocket, an arm connected at one end to said barrel and at the other end to said plate, and means upon said frame for depressing said arm at regular intervals to open said pocket, substantially as described.

3. In a device of the class described, a frame, in combination with a furrow opener, a seed barrel mounted for rotation in said frame, a discharge opening therein, a plate pivotally mounted on said barrel and normally closing said opening, said plate forming with the walls of said opening a seed pocket of sufficient size to hold but one seed, means for guiding a seed into said pocket and preventing arching of the seed and means for opening said pocket at regular intervals, substantially as described.

4. In a device of the class described, a suitable frame provided with a furrow opener and a furrow closer, in combination with a seed barrel mounted for rotation in said frame, means for rotating said barrel, a discharge opening in said barrel, the lower wall of said opening when in discharge position being outwardly inclined, a plate normally closing said opening and forming with said inclined wall a seed pocket, said plate being pivoted upon an axis extending transversely across said opening and means for swinging said plate upon said axis at regular intervals to open said pocket, substantially as described.

5. In a device of the class described, a suitable frame and a furrow opener in combination with a seed barrel mounted for rotation in said frame, said barrel being formed of a plurality of slats and a pair of end members, means for rotating said barrel, a discharge opening in said barrel, the lower wall of said opening when in discharge position being outwardly inclined, a plate normally closing said opening and pivoted upon an axis extending transversely across said opening, said plate having a curved end forming with said inclined wall, a seed pocket to hold one seed, a flange arranged upon each side of said opening and adapted to guide the seed into said pocket and means for swinging said plate upon its axis at regular intervals to open the pocket, substantially as described.

6. In a device of the class described, a suitable frame and a furrow opener, in combination with a seed barrel mounted for rotation in said frame, said barrel comprising a cylindrical member formed of solid end members and a plurality of parallel slats, means for rotating said barrel, a discharge opening in said barrel formed by cutting away a section of one of the slats and a portion of the adjacent slat, a pair of metal strips secured to the loose ends of said slat and to the adjacent slats, a plate pivotally mounted on said barrel and normally closing said discharge opening and forming with the walls of said opening a seed pocket, means for depressing one end of said plate at regular intervals to open said pocket, and a furrow closer, substantially as described.

In testimony whereof, I have signed my name to this specification in the presence of two subscribing witnesses.

ROBERT BLAIR.

Witnesses:
HELEN F. LILLIS,
F. E. SHEEHY.